United States Patent
Zaike (10) Patent No.: US 9,731,748 B2
(45) Date of Patent: Aug. 15, 2017

(54) STEERING APPARATUS AND HOUSING

(71) Applicant: Showa Corporation, Gyoda-shi (JP)

(72) Inventor: Yasuhiro Zaike, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 17 days.

(21) Appl. No.: 14/497,819

(22) Filed: Sep. 26, 2014

(65) Prior Publication Data

US 2015/0266500 A1    Sep. 24, 2015

(30) Foreign Application Priority Data

Mar. 18, 2014 (JP) .................................. 2014-054753

(51) Int. Cl.
| | |
|---|---|
| *B62D 3/12* | (2006.01) |
| *F16H 57/029* | (2012.01) |
| *F16J 3/04* | (2006.01) |
| *F16H 57/02* | (2012.01) |

(52) U.S. Cl.
CPC ............ *B62D 3/12* (2013.01); *F16H 57/029* (2013.01); *F16J 3/042* (2013.01); *F16H 2057/02017* (2013.01); *F16H 2057/02082* (2013.01); *Y10T 74/1967* (2015.01)

(58) Field of Classification Search
CPC .......... B62D 3/12; F16J 3/042; F16H 57/029; F16D 3/845
See application file for complete search history.

(56) References Cited

U.S. PATENT DOCUMENTS

| | | | | |
|---|---|---|---|---|
| 4,721,175 A | * | 1/1988 | Butler ...................... | B62D 5/22 180/428 |
| 5,251,916 A | * | 10/1993 | Martin ..................... | F16D 3/845 277/636 |
| 5,295,914 A | * | 3/1994 | Milavec .................. | F16D 3/845 277/636 |
| 6,464,233 B1 | * | 10/2002 | Oetiker ................... | F16D 3/845 277/636 |
| 6,550,350 B2 | * | 4/2003 | Martin ..................... | B62D 3/12 277/635 |
| 7,207,891 B2 | * | 4/2007 | Kashiwagi .............. | F16D 3/845 277/636 |
| 2002/0149158 A1 | * | 10/2002 | Havercamp .............. | F16J 3/042 277/634 |
| 2003/0069075 A1 | * | 4/2003 | Furuta ..................... | F16D 3/845 464/175 |

(Continued)

FOREIGN PATENT DOCUMENTS

JP    2008-230517 A    10/2008

*Primary Examiner* — Paul N Dickson
*Assistant Examiner* — Timothy Wilhelm
(74) *Attorney, Agent, or Firm* — Leason Ellis LLP (57) ABSTRACT

A housing extends in an axial direction of a rack shaft connected to a pinion shaft so as to cover at least the rack shaft, and has an end portion on which a cover member is fitted to cover the end portion. The housing includes a holding portion that has an inner side sinking in a radial direction of the housing, and holds the cover member, and a plurality of convex portions that protrude in the radial direction of the housing, and are circumferentially disposed on a downstream side of the holding portion in a fit-in direction of the cover member, while separating from the holding portion by a predetermined distance in the fit-in direction.

10 Claims, 7 Drawing Sheets

(56) References Cited

U.S. PATENT DOCUMENTS

| | | | |
|---|---|---|---|
| 2004/0159976 A1* | 8/2004 | Sueoka | B29C 45/14336 264/267 |
| 2005/0184480 A1* | 8/2005 | Arlt | F16J 3/042 280/89.12 |
| 2007/0178978 A1* | 8/2007 | Boutin | F16J 3/042 464/175 |
| 2010/0197413 A1* | 8/2010 | Takabe | F16D 3/223 464/106 |
| 2013/0252748 A1* | 9/2013 | Sugiyama | F16C 1/04 464/162 |

* cited by examiner

ONE SIDE ← → THE OTHER SIDE
AXIAL DIRECTION

STEERING APPARATUS AND HOUSING

CROSS-REFERENCE TO RELATED APPLICATIONS

This application is based on and claims priority under 35 USC 119 from Japanese Patent Application No. 2014-054753 filed on Mar. 18, 2014, the entire content of which is incorporated herein by reference.

BACKGROUND OF THE INVENTION

1. Technical Field

The present invention relates to a steering apparatus and a housing.

2. Related Art

A steering apparatus for a vehicle or the like is provided with an input portion that receives a steering force from a steering portion such as a steering wheel, and an output portion that receives the steering force from the input portion, and transmits the steering force to a steered portion such as a wheel. The steering apparatus uses a rack and pinion mechanism that has a pinion shaft and a rack shaft having a rack connected to a pinion of the pinion shaft so as to transmit a force from the input portion to the output portion.

The pinion shaft or the rack shaft is accommodated in a predetermined housing. A cover member, a so-called boot, is attached to at least the housing accommodating the rack shaft, and covers an end portion of the housing (for example, refer to JP-A-2008-230517).

SUMMARY OF THE INVENTION

The cover member is attached to the end portion of the housing at a predetermined position. Accordingly, for example, when the cover member is pushed excessively from a predetermined installation position, while being attached to the housing, it is necessary to pull the cover member back to the predetermined installation position. In the related art, there is the possibility that when the cover member is attached to the housing, it takes considerable time to align the cover member with a predetermined installation position, and working efficiencies deteriorate.

An object of the present invention is to improve working efficiencies when a cover member is attached to a housing.

An aspect of the present invention provides a steering apparatus that includes a pinion shaft that has a pinion, and rotates in response to steering of a steering portion; a rack shaft that has a rack meshing with the pinion of the pinion shaft, and moves a steered portion; a housing that extends in an axial direction of the rack shaft, and accommodates at least the rack shaft; and a cover member that has a connection portion connected to an end portion of the housing, and is fitted on and covers the end portion. The housing includes a holding portion that has an inner side sinking in a radial direction of the housing, and holds the connection portion of the cover member; and a movement restraint portion that is provided on a downstream side of the holding portion in a fit-in direction of the cover member, while separating from the holding portion by a predetermined distance in the fit-in direction, and prevents the cover member from moving inwardly in the axial direction.

Here, a distance between the movement restraint portion and a downstream-side end portion of the holding portion in the fit-in direction may be shorter than a length of the connection portion of the cover member in the fit-in direction.

The cover member may have a specific protruding portion that protrudes from an end portion of the connection portion in the fit-in direction. The movement restraint portion may protrude in a radial direction of the housing. A height of the downstream-side end portion of the holding portion in the fit-in direction may be shorter than a distance between a radially inner circumference of the connection portion of the cover member and the specific protruding portion.

A distance between the movement restraint portion and the downstream-side end portion of the holding portion in the fit-in direction may be longer than a length by which the specific protruding portion protrudes from the connection portion.

The movement restraint portion may include a plurality of the protruding portions that protrude in the radial direction of the housing.

The movement restraint portion may protrude in the radial direction of the housing, and may be formed in a circumference direction of the housing.

Another aspect of the present invention provides a housing that extends in an axial direction of a rack shaft connected to a pinion shaft so as to cover at least the rack shaft, and has an end portion on which a cover member is fitted to cover the end portion. The housing includes a holding portion that has an inner side sinking in a radial direction of the housing, and holds the cover member; and a plurality of convex portions that protrude in the radial direction of the housing, and are circumferentially disposed on a downstream-side of the holding portion in a fit-in direction of the cover member, while separating from the holding portion by a predetermined distance in the fit-in direction.

According to the aspects of the present invention, it is possible to improve working efficiencies when the cover member is attached to the housing.

DETAILED DESCRIPTION OF THE INVENTION

Hereinafter, an embodiment of the present invention will be described in detail with reference to the accompanying drawings.

Figure 1:
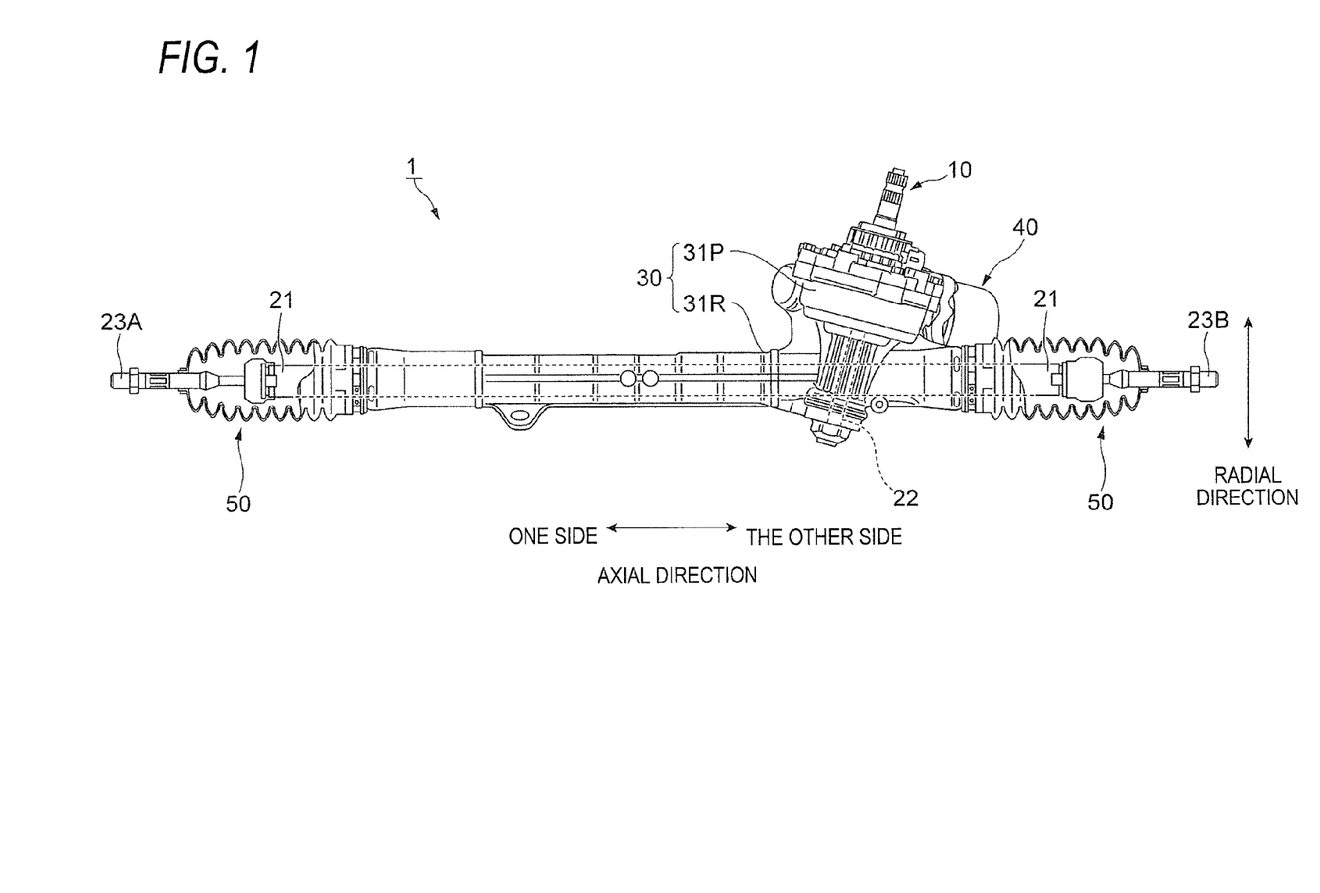
FIG. 1 is a schematic configuration view of a steering apparatus of an embodiment.

FIG. 1 is a schematic configuration view of a steering apparatus 1 of the embodiment.

Figure 2:
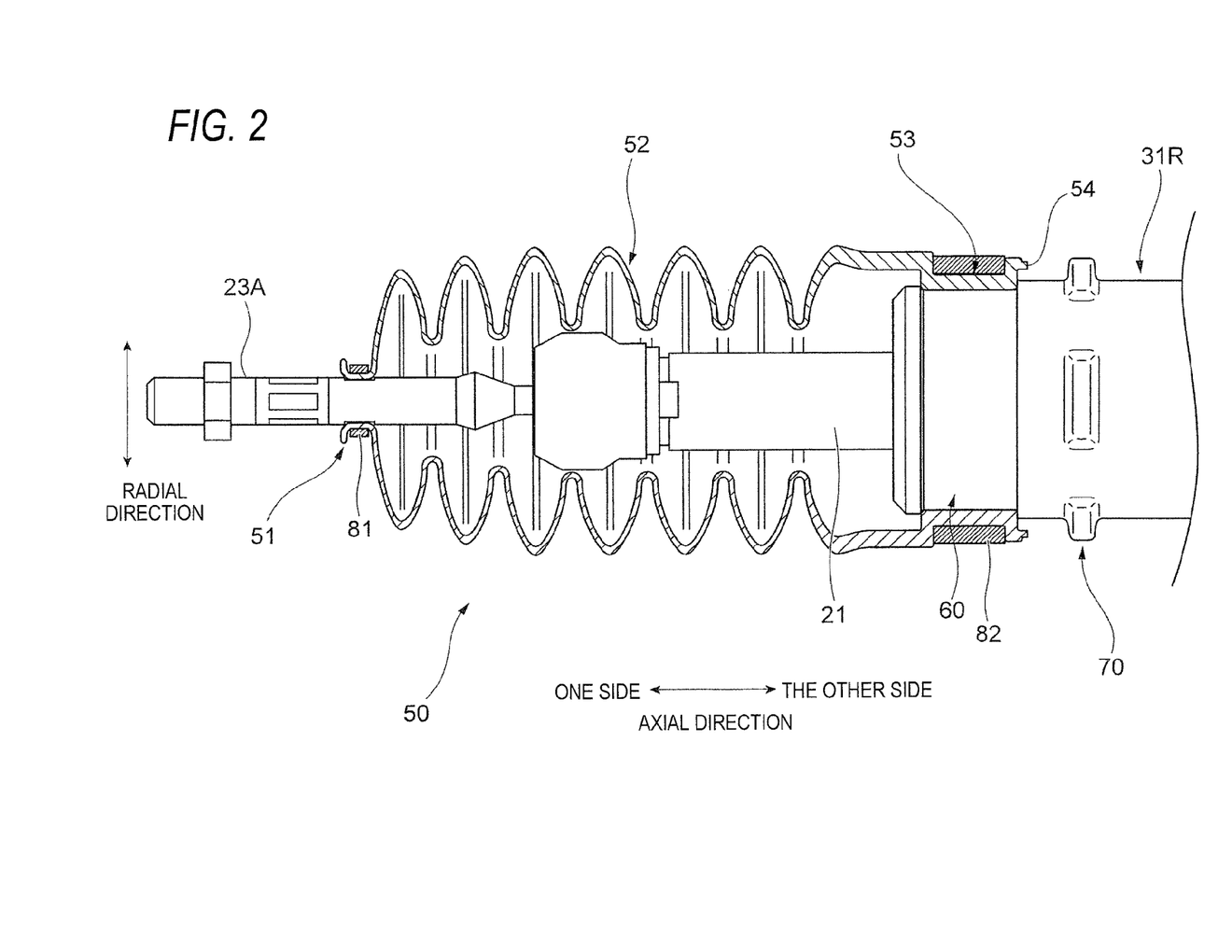
FIG. 2 is a view describing a cover member, a cover holding portion, and a stopper portion of the embodiment.

FIG. 2 is a view describing a cover member 50, a cover holding portion 60, and a stopper portion 70 of the embodiment.

The steering apparatus 1 of the embodiment is a steering apparatus that arbitrarily changes a travelling direction of a vehicle, and the embodiment illustrates an example in which the steering apparatus 1 is applied to a motor vehicle. The steering apparatus 1 of the embodiment is a so-called pinion-assist type.

In the embodiment, a longitudinal direction of the steering apparatus 1 illustrated in FIG. 1 is simply referred to as "an axial direction", and a "radial direction" simply refers to a direction that is perpendicular to the shaft center in the axial direction of the steering apparatus 1.

Entire Configuration of Steering Apparatus

As illustrated in FIG. 1, the steering apparatus 1 includes an input shaft 10 to which a steering force is transmitted from a wheel-shaped steering wheel (a steering portion) which is turned by a driver; a rack shaft 21 that is provided to extend in the axial direction, and is connected to a tire (a steered portion) to change an orientation of the tire; and a pinion shaft 22 that receives torque from the input shaft 10, and moves the rack shaft 21 in the axial direction.

In addition, the steering apparatus 1 includes a tie rod 23A (23B) that is provided in an end portion of the rack shaft 21, and is connected to the tire via a knuckle arm (not illustrated); a housing 30 that accommodates various members; an electric motor 40 that exerts a steering assisting force on the pinion shaft 22; and a cover member 50 that is an example of a cover member, and covers a range of from an end portion of the housing 30 to an end portion of the rack shaft 21.

In the steering apparatus 1 having the above-mentioned configuration, a steering torque exerted on the steering wheel is expressed as a relative rotation angle between the input shaft 10 and the pinion shaft 22, and a torque detecting device detects the steering torque based on the relative rotation angle between the input shaft 10 and the pinion shaft 22. An electronic control unit calculates the steering torque based on an output value from the torque detecting device, and controls the drive of the electric motor 40 based on the calculated steering torque. Torque generated by the electric motor 40 is transmitted to a worm gear (not illustrated) coaxial with a motor shaft, a worm wheel (not illustrated) meshing with the worm gear, and then is transmitted to the pinion shaft 22 coaxial with the worm wheel.

Accordingly, the torque generated by the electric motor 40 applies an assisting force with which a driver is assisted in steering the steering wheel. That is, the pinion shaft 22 rotates due to the steering torque generated by the rotation of the steering wheel and the assisting torque exerted by the electric motor 40. The rotation of the pinion shaft 22 causes the rack shaft 21 to move in the axial direction, thereby turning the wheels.

Configuration of Housing 30

The housing 30 includes a pinion housing 31P that mainly accommodates the pinion shaft 22, and a rack housing 31R that mainly accommodates the rack shaft 21.

The pinion housing 31P has a substantially cylindrical outline. The pinion housing 31P is provided in a cylindrical axial direction that intersects the axial direction of the rack housing 31R. The pinion housing 31P rotatably holds the pinion shaft 22.

The rack housing 31R has a substantially cylindrical outline, and is provided along the rack shaft 21 in the axial direction. The rack housing 31R supports the rack shaft 21 via a bush which is not illustrated, and holds, yet allows the rack shaft 21 to be movable in the axial direction. The rack housing 31R has an axial length shorter than that of the rack shaft 21. Accordingly, when the rack shaft 21 is attached to the rack housing 31R, the rack shaft 21 protrudes from an end portion of the rack housing 31R.

As illustrated in FIG. 2, the rack housing 31R has a cover holding portion 60 as an example of a holding portion that is provided in each of opposite end portions in the axial direction of the rack shaft 21 so as to hold the cover member 50, and the stopper portion 70 as an example of a movement restraint portion that prevents the cover member 50 from excessively being pushed inwardly in the axial direction when the cover member 50 is attached to the rack housing 31R.

In the embodiment, the cover holding portion 60 and the stopper portion 70 are formed integrally with a main body of the rack housing 31R. Specifically, each of the cover holding portion 60 and the stopper portion 70 is not fixed to the main body of the rack housing 31R as a separate component, but is formed as a portion of the rack housing 31R by diecasting or the like.

Configuration of Cover Member 50

As illustrated in FIG. 2, the cover member 50 has a rod connection portion 51 that is connected to the tie rod 23A (23B); a compressible and expandable portion 52 that is compressible and expandable; a housing connection portion 53 that is connected to the rack housing 31R; and a molded protruding portion 54 (a specific protruding portion) that is formed in an end portion of the housing connection portion 53.

It is possible to use the following materials as a material of the cover member 50: a thermoplastic elastomer such as a highly cross-linked olefinic thermoplastic elastomer; chloroprene rubber; EPDM; chlorosulfonated polyethylene; and the like.

The cover member 50 covers the end portion of the rack housing 31R, a portion of the tie rod 23A (23B), and the end portion of the rack shaft 21 so, thereby preventing dust and the like from entering the rack housing 31R.

As illustrated in FIG. 2, the rod connection portion 51 is a portion that is connected to the tie rod 23A (23B). For example, an exterior side of the rod connection portion 51 is tightened by an annular first fixing member 81, and thus the rod connection portion 51 is fixed to the tie rod 23A (23B), while being air tightened with the tie rod 23A (23B).

The compressible and expandable portion 52 has a bellows shape. The compressible and expandable portion 52 compresses and expands in the axial direction, following a motion of the tie rod 23A (23B) in association with the movement of the rack shaft 21.

Figure 3A:
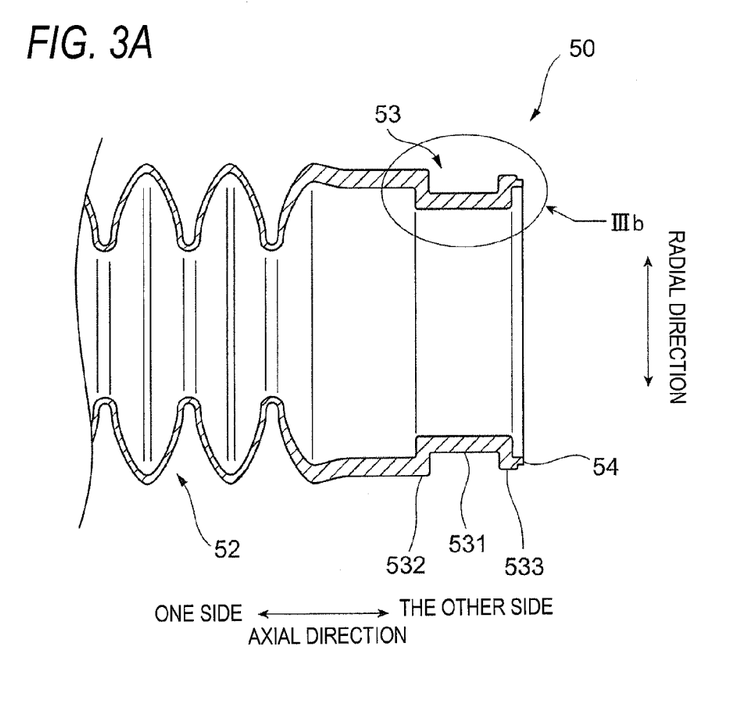
FIGS. 3A and 3B are views describing the cover member of the embodiment in detail.
Figure 3B:
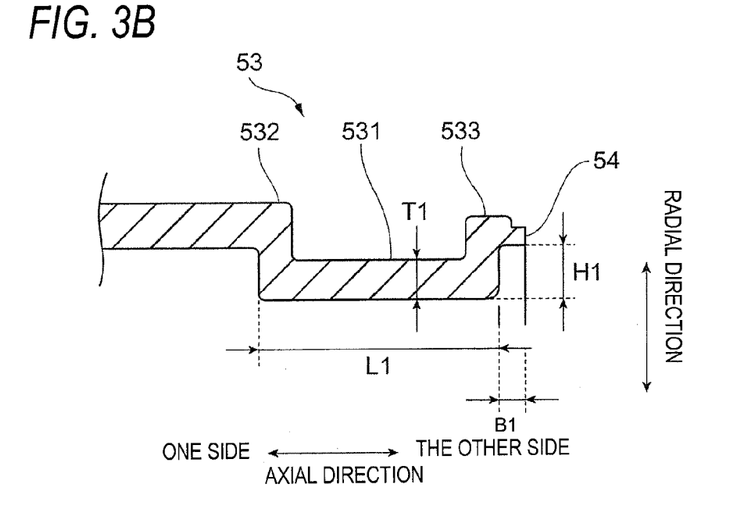

FIGS. 3A and 3B are views describing the cover member 50 of the embodiment in detail. FIG. 3A is a cross-sectional view of main parts of the cover member 50, and FIG. 3B is an enlarged view of portion IIIb illustrated in FIG. 3A.

As illustrated in FIG. 3A, the housing connection portion 53 has a substantially concave shape. Specifically, the housing connection portion 53 has a first connection portion 531 that extends in the axial direction; a second connection portion 532 that extends and rises from one end portion of the first connection portion 531 in the radial direction; and a third connection portion 533 that extends and rises from the other end portion of the first connection portion 531 in the radial direction.

An inner circumference of the housing connection portion 53 protrudes inwardly in the radial direction, and thus can be connected to the cover holding portion 60 which will be described later. An outer circumference of the housing connection portion 53 sinks inwardly in the radial direction, and thus a substantially annular second fixing member 82

(refer to FIG. 2) can be attached to the outer circumference so as to fix the cover member 50 to the rack housing 31R.

The molded protruding portion 54 protrudes from the end portion of the housing connection portion 53 in the axial direction. In the embodiment, for example, the molded protruding portion 54 can be molding processed when the cover member 50 is molded. For example, the housing connection portion 53 is disposed in an end portion of the cover member 50. When the housing connection portion 53 is molded into a predetermined shape, an extra space is formed further outside of a molding flask in such a manner that the molding flask for the molding of the housing connection portion 53 is sufficiently filled with a material. Accordingly, in the embodiment, the material flows into the extra space, and thus the molded protruding portion 54 is formed in the end portion of the housing connection portion 53.

Subsequently, the length of each of the configuration portions of the cover member 50 described above will be described with reference to FIG. 3B.

The first connection portion 531 has an axial length "L1". The first connection portion 531 has a radial thickness "T1". The molded protruding portion 54 has a protrusion length "B1" by which the molded protruding portion 54 protrudes from the housing connection portion 53 (the third connection portion 533) in the axial direction. The molded protruding portion 54 has a height "H1" that is a radial height from an inner circumference of the first connection portion 531.

Here, first, the structure of a housing of each of comparative examples will be described so that the cover holding portion 60 of the embodiment can be described.

Figure 7A:
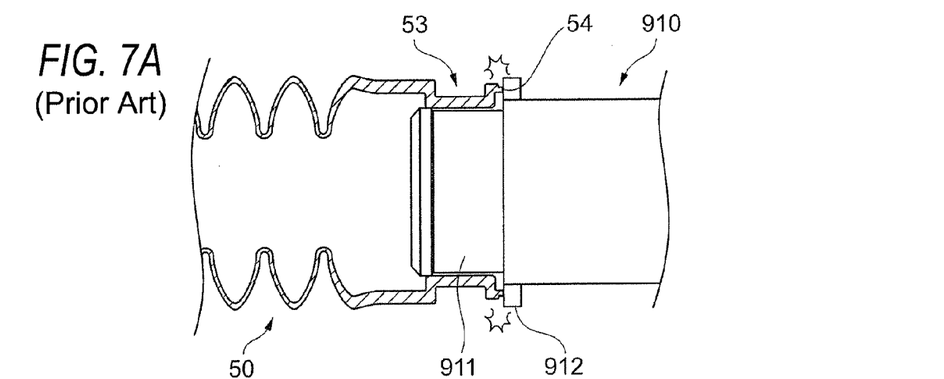
FIGS. 7A to 7C are views, each of which describes the structure of a housing of a comparative example.
Figure 7B:
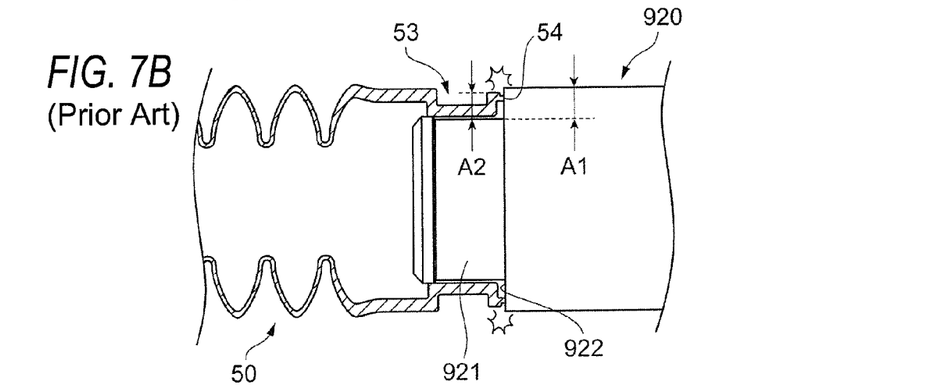
Figure 7C:
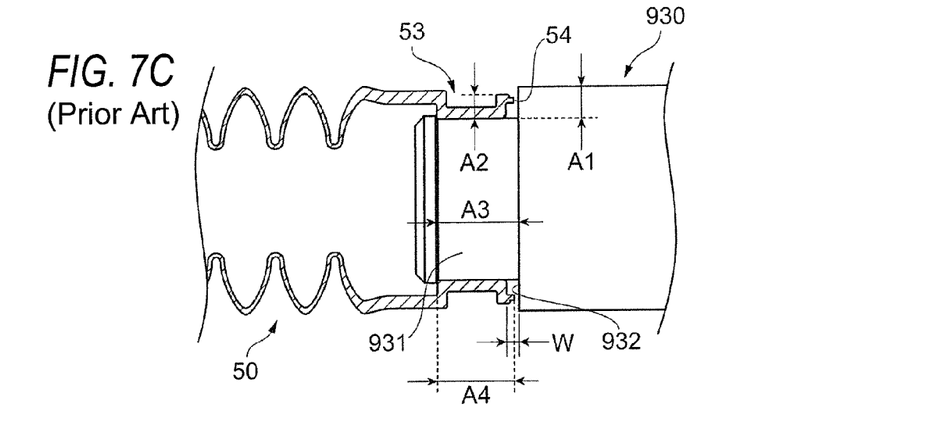

FIGS. 7A to 7C are views, each of which describes the structure of the housing of the comparative example.

As illustrated in FIG. 7A, a housing 910 of a first comparative example includes a stopper 912 that is provided on the downstream side of a holding groove 911 in a fit-in direction (in the axial direction) of the cover member 50 for holding the housing connection portion 53 of the cover member 50. The stopper 912 is formed in the same position in which the downstream-side end portion in the holding groove 911 in the fit-in direction of the cover member 50 is formed, and thus there is no gap between the downstream-side end portion of the holding groove 911 and the stopper 912.

For this reason, the molded protruding portion 54 of the cover member 50 is brought into contact with the stopper 912. As a result, there is a problem in that the housing connection portion 53 cannot be accommodated in the holding groove 911, and the cover member 50 is unreliably attached to the housing 910.

In addition, as illustrated in FIG. 7B, a housing 920 of a second comparative example has a holding groove 921 that holds the housing connection portion 53 of the cover member 50. An end portion 922 is formed on the downstream side in the holding groove 921 in the fit-in direction. The end portion 922 has a height A1 greater than a radial width A2 of the housing connection portion 53 in such a manner that the cover member 50 is prevented from being excessively fitted in the fit-in direction (in the axial direction).

For this reason, the molded protruding portion 54 positioned at the end portion of the housing connection portion 53 is brought into contact with the end portion 922. As a result, there is a problem in that the housing connection portion 53 is not accommodated in the holding groove 921, and the cover member 50 is unreliably attached to the housing 920.

In addition, as illustrated in FIG. 7C, a housing 930 of a third comparative example has a holding groove 931 that holds the housing connection portion 53 of the cover member 50. An end portion 932 is formed on the downstream side in the holding groove 931 in the fit-in direction. The end portion 932 has the height A1 greater than the radial width A2 of the housing connection portion 53 in such a manner that the cover member 50 is prevented from being excessively fitted in the fit-in direction (in the axial direction). Furthermore, the holding groove 931 has an axial length A3 longer than an axial length A4 which is obtained when the axial length of the housing connection portion 53 is added to the axial length of the molded protruding portion 54.

Accordingly, there is a problem in that a gap W is formed between the holding groove 931 and the end portion of the housing connection portion 53, the cover member 50 can move in the axial direction by the amount of gap W, and the cover member 50 is unreliably attached to the housing 930.

Figure 4A:
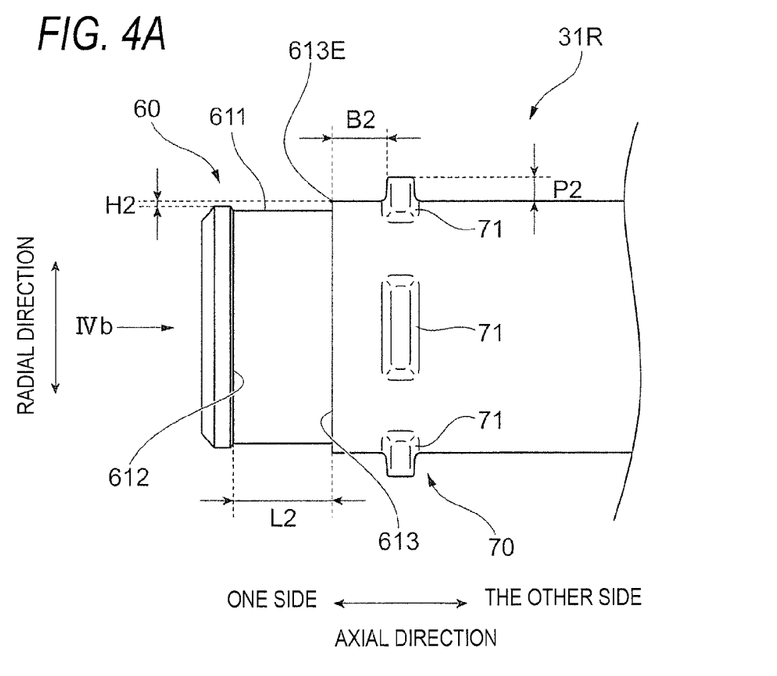
FIGS. 4A and 4B are views describing the cover holding portion of the embodiment in detail.
Figure 4B:
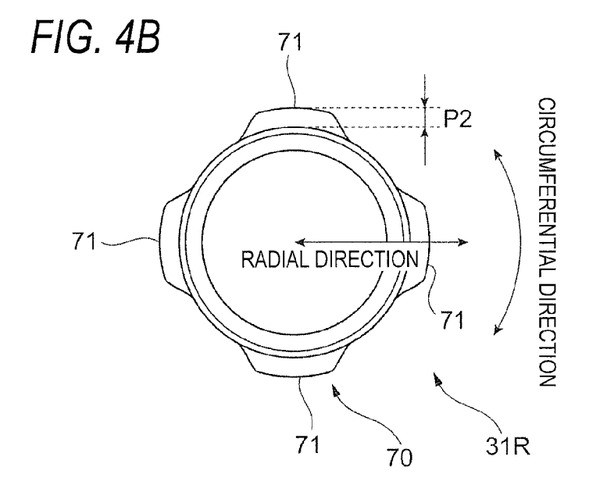

FIGS. 4A and 4B are views describing the cover holding portion 60 of the embodiment in detail. FIG. 4A is a side view of the cover holding portion 60, and FIG. 4B is a view of the cover holding portion 60 when seen from arrow IVb illustrated in FIG. 4A.

Configuration of Cover Holding Portion 60

As illustrated in FIG. 4A, the cover holding portion 60 is a groove that is formed in a circumferential direction, and that has a predetermined width in the axial direction. The cover holding portion 60 sinks inwardly in the radial direction of the rack housing 31R, and thus holds the housing connection portion 53.

The cover holding portion 60 has a bottom portion 611 that is formed in the axial direction; a first wall portion 612 that rises in the radial direction from one side in the axial direction of the bottom portion 611; and a second wall portion 613 that rises in the radial direction from the other side in the axial direction of the bottom portion 611. As illustrated in FIG. 4A, an end portion 613E is formed in an outer portion of the second wall portion 613 in the radial direction.

The bottom portion 611 faces the first connection portion 531 of the housing connection portion 53. In the embodiment, as illustrated in FIG. 4A, the bottom portion 611 has an axial length L2. The length L2 is set to be approximately the same as the length L1 of the first connection portion 531.

The first wall portion 612 is a surface facing the other side in the axial direction. The first wall portion 612 faces the second connection portion 532, thereby preventing the housing connection portion 53 from moving to one side. The height of the first wall portion 612 is set so as to prevent the housing connection portion 53 from slipping out of its position when the attached housing connection portion 53 is pulled to one side.

The second wall portion 613 is a surface facing one side in the axial direction. The second wall portion 613 faces the third connection portion 533, thereby preventing the housing connection portion 53 from moving to the other side. The height H2 (a distance from the bottom portion 611 to the end portion 613E in the circumferential direction) of the second wall portion 613 is set so as to prevent the housing connection portion 53 from slipping out of its position when the attached housing connection portion 53 is pushed to the other side, that is, inwardly in the axial direction. In the embodiment, the second wall portion 613 has the height H2 less than the height H1 (refer to FIG. 3B) of the molded protruding portion 54. Accordingly, in the embodiment, the molded protruding portion 54 is prevented from sitting on the second wall portion 613.

Configuration of Stopper Portion 70

As illustrated in FIG. 4B, the stopper portion 70 includes a plurality of (four in the embodiment) protruding portions 71 (convex portions). In the embodiment, the plurality of protruding portions 71 has substantially the same shape. The plurality of protruding portions 71 is disposed on an outer circumference of the rack housing 31R at substantially equal intervals in the circumferential direction.

In the embodiment, the plurality of protruding portions 71 is provided. Accordingly, when the cover member 50 is attached to the rack housing 31R, the rack housing 31R can receive the cover member 50 substantially straight in the axial direction. As a result, when the cover member 50 is attached to the rack housing 31R, the cover member 50 does not incline, and it is possible to improve working efficiencies. In addition, since the plurality of protruding portions 71 is disposed at the substantially equal intervals in the circumferential direction, the rack housing 31R can better receive the cover member 50 without an inclination.

As illustrated in FIG. 4A, the stopper portion 70 is provided on the downstream side of the holding portion 60 in the fit-in direction (in the axial direction) of the cover member 50, while separating from the cover holding portion 60 by a predetermined distance B2 in the fit-in direction. As illustrated in the embodiment, when the stopper portion 70 includes the plurality of protruding portions 71, each of the protruding portions 71 is provided while separating from the cover holding portion 60 by the predetermined distance B2.

The distance B2 is preferably constant, thereby it is possible to correspond to a plurality of types of cover members 50 having different shapes. In the embodiment, the stopper portion 70 is formed corresponding to the molded protruding portion 54 of the cover member 50 illustrated in FIGS. 3A and 3B. That is, the distance B2 is set to be longer than the length B1 which is the protrusion length of the molded protruding portion 54. In addition, the distance B2 is set to be shorter than the length L1 of the first connection portion 531.

A protruding height P2 is a height by which the protruding portion 71 protrudes from the rack housing 31R, and is set in such a manner that the protruding portions 71 can receive the cover member 50 when the cover member 50 is pushed, and prevent the cover member 50 from moving inwardly beyond the protruding portions 71 in the fit-in direction. In the embodiment, the protruding height P2 is set to be greater than or equal to at least the thickness T1 of the first connection portion 531 of the housing connection portion 53. In addition, the protruding height P2 is preferably set in such a manner that the cover member 50 can be prevented from moving to the other side. From the viewpoint that it is necessary to suppress an increase in weight of the rack housing 31R, the protruding height P2 is preferably set in such a manner that the protrusion of the protruding portion 71 does not exceed the maximum outer diameter of the cover member 50 and is smaller than or equal to the outer diameter of the cover member 50.

Figure 5A:
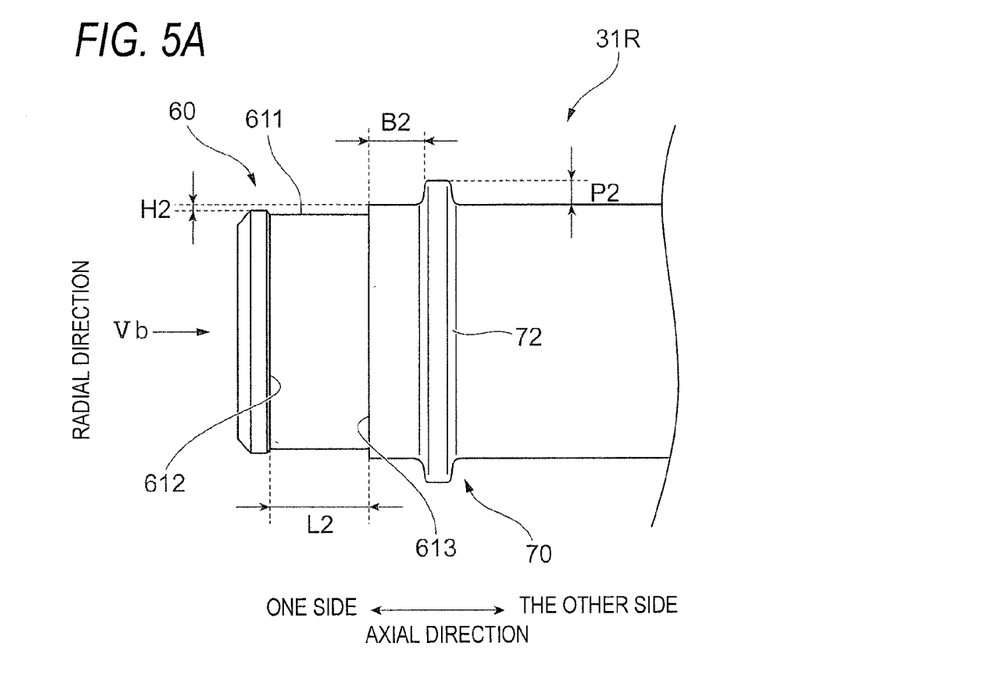
FIGS. 5A and 5B are views describing the stopper portion of a modification example.
Figure 5B:
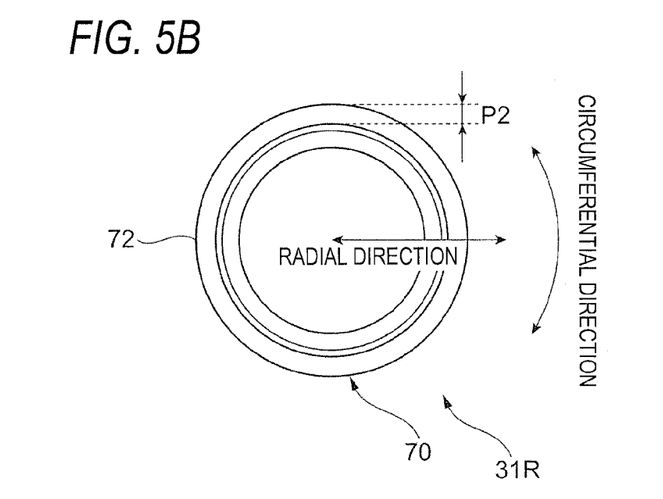

FIGS. 5A and 5B are views describing the stopper portion 70 of a modification example. FIG. 5A is a side view of the cover holding portion 60, and FIG. 5B is a view of the cover holding portion 60 when seen from arrow Vb illustrated in FIG. 5A.

In the embodiment, the stopper portion 70 includes the plurality of protruding portions 71 formed discretely in the circumferential direction, but the present invention is not limited to the embodiment.

As illustrated in FIG. 5A, the stopper portion 70 may include a convex rim portion 72 formed on the entire outer circumference of the rack housing 31R. As illustrated in FIG. 5B, the convex rim portion 72 (a convex portion) protrudes in the radial direction, and has an annular shape. Similarly to the above-mentioned protruding portion 71, the convex rim portion 72 separates from the cover holding portion 60 by the distance B2, and protrudes from the outer circumference of the rack housing 31R by the protruding height P2.

As illustrated in FIG. 5B, the convex rim portion 72 has a circular shape that continuously goes around the circumference of the rack housing 31R. However, for example, the convex rim portion 72 may partially have a notched portion. That is, it is preferred that the outline of the convex rim portion 72 be circumferentially formed on the entire circumference of the rack housing 31R.

As illustrated in the embodiment, when the stopper portion 70 is molded integrally with the rack housing 31R by diecasting or the like, the stopper portion 70 preferably includes the plurality of protruding portions 71 from the viewpoint of manufacturing efficiencies of the rack housing 31R. That is, typically, when being die-cast manufactured, the rack housing 31R is formed by using a plurality of the molding flasks, and the molding flasks are removed in the radial direction of the rack housing 31R. In this manner, the stopper portion 70 is not continuously formed in the circumferential direction, but is formed in a state of being divided into the plurality of protruding portions 71, and thus it is possible to reduce a step of eliminating so-called burrs that may be formed in the stopper portion 70.

Figure 6:
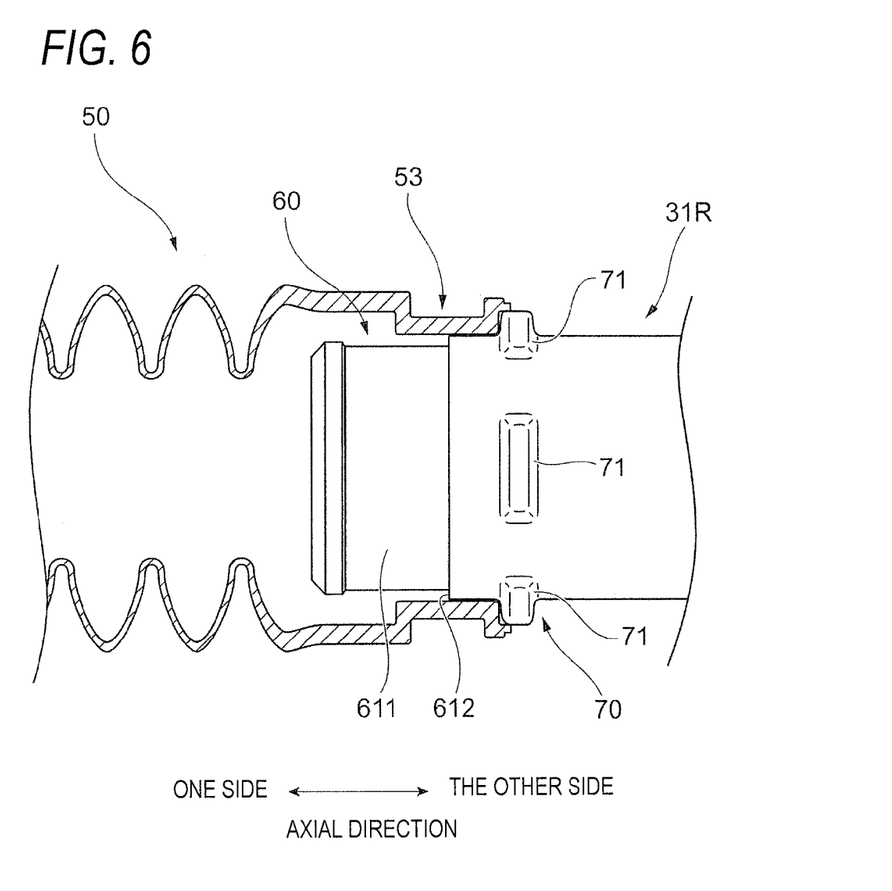
FIG. 6 is a view describing a step of attaching the cover member to a rack housing.

FIG. 6 is a view describing a step of attaching the cover member 50 to the rack housing 31R.

For example, as illustrated in FIG. 6, when the cover member 50 is attached to the rack housing 31R, the cover member 50 is fitted inwardly in the axial direction, that is, to the other side in the axial direction. At this time, the housing connection portion 53 of the cover member 50 may pass the cover holding portion 60. In the embodiment, in this case, the protruding portions 71 of the stopper portion 70 stop the end portion on the other side of the cover member 50. Accordingly, the stopper portion 70 prevents the cover member 50 from moving inwardly beyond the stopper portion 70 in the axial direction. The amount of pushing on the cover member 50 is controlled constant by the stopper portion 70. For this reason, as illustrated in FIG. 2, it is possible to install the housing connection portion 53 on the cover holding portion 60, that is, at a predetermined installation position by only pulling the cover member 50 back with a relatively small force.

In addition, the height H2 of the second wall portion 613 of the cover holding portion 60 is set to be less than the height H1 of the molded protruding portion 54. For this reason, the molded protruding portion 54 provided in the end portion of the cover member 50 is not brought into contact with the stopper portion 70. In addition, the cover holding portion 60 can hold the housing connection portion 53 in a state of not deviating in the axial direction and the radial direction.

In the embodiment, when the cover member 50 is attached to the rack housing 31R in this manner, it is possible to improve working efficiencies.

In the embodiment, as described above, the distance B2 between the stopper portion 70 and the cover holding portion 60 is set to be shorter than the length L1 of the housing connection portion 53. For this reason, when the housing connection portion 53 is pushed inwardly in the axial direction, passing the cover holding portion 60, it is possible to reduce a force required to pull the housing connection portion 53 back to the cover holding portion 60.

That is, the housing connection portion 53 has an inner diameter smaller than that of other portions of the cover member 50. The cover member 50 is made of a relatively hard material for its functions. When the housing connection portion 53 is fitted in its entire length on the outer circumference of the rack housing 31R having an outer diameter greater than that of the cover holding portion 60, an operator requires a relatively strong force to pull the cover member 50 out. There is a high possibility that when a force of pulling the cover member 50 is strong, and the cover member 50 is excessively pulled back, the housing connection portion 53 deviates to one side of the cover holding portion 60. At this time, it is necessary to again adjust the attachment position of the cover member 50.

In contrast, in the embodiment, as described above, since a distance between the stopper portion 70 and the cover holding portion 60 is set to the distance B2, at least a portion of the housing connection portion 53 stays in the cover holding portion 60 even when the cover member 50 is pushed. Accordingly, it is possible to make a force required to pull the cover member 50 back relatively small. In the embodiment, it is possible to improve working efficiencies when the cover member 50 is attached to the rack housing 31R.

In the embodiment, the electric power steering apparatus is described as an example, but particularly, the present invention is not limited to the embodiment. The present invention may be applied to the electric power steering apparatuses of other types such as a rack-assist electric power steering apparatus. The present invention may be applied to a hydraulic power steering apparatus that provide an assisting force, or a manual steering apparatus that does not provide an assisting force.

What is claimed is:

1. A steering apparatus comprising:
   a pinion shaft that has a pinion, and rotates in response to steering of a steering portion;
   a rack shaft that has a rack meshing with the pinion of the pinion shaft, and moves a steered portion;
   a housing that extends in an axial direction of the rack shaft, and accommodates at least the rack shaft; and
   a cover member that has a connection portion connected to an end portion of the housing, and is fitted on and covers the end portion,
   wherein the housing includes
   a holding portion that is recessed inwardly in a radial direction of the housing, and holds the connection portion of the cover member; and
   a movement restraint portion that is provided on a downstream side of the holding portion in the axial direction of the cover member, while being separated from the holding portion by a predetermined distance in the axial direction, and prevents the cover member from moving inwardly in the axial direction, wherein
   the connection portion contains a first connection portion that has a flat inner surface which abuts the holding portion and
   the movement restraint portion is configured to receive a downstream end of the flat inner face when the cover member is pushed inwardly in the axial direction.

2. The steering apparatus according to claim 1,
   wherein the predetermined distance is a distance between an upstream end of the movement restraint portion and a downstream-side end portion of the holding portion in the axial direction, and
   the predetermined distance is shorter than a length of the connection portion of the cover member in the axial direction.

3. The steering apparatus according to claim 2,
   wherein the cover member has a specific protruding portion that protrudes from an end portion of the connection portion in the axial direction,
   the movement restraint portion protrudes in a radial direction of the housing, and
   a height of the downstream-side end portion of the holding portion in the axial direction is shorter than a distance between a radially inner circumference of the connection portion of the cover member and the specific protruding portion.

4. The steering apparatus according to claim 1,
   wherein the cover member has a specific protruding portion that protrudes from an end portion of the connection portion in the axial direction,
   the movement restraint portion protrudes in a radial direction of the housing, and
   a height of the downstream-side end portion of the holding portion in the axial direction is shorter than a distance between a radially inner circumference of the connection portion of the cover member and the specific protruding portion.

5. The steering apparatus according to claim 1,
   wherein the predetermined distance is longer than a length by which the specific protruding portion protrudes from the connection portion.

6. The steering apparatus according to claim 1,
   wherein the movement restraint portion includes a plurality of the protruding portions that protrude in the radial direction of the housing.

7. The steering apparatus according to claim 1,
   wherein the movement restraint portion protrudes in the radial direction of the housing, and is formed in a circumference direction of the housing.

8. The steering apparatus according to claim 1,
   wherein the connection portion includes a specific protruding portion that protrudes in the axial direction from a radially-inner side of the end portion of the connection portion.

9. The steering apparatus according to claim 1,
   wherein one end of the holding portion is defined by a shoulder portion and
   the movement restraint portion is separated and spaced axially from the shoulder portion by the predetermined distance such that the shoulder portion is formed exclusive of the movement restraint portion.

10. The steering apparatus according to claim 1, wherein an entire surface of the flat inner surface abuts the holding portion.

* * * * *